United States Patent
De Groot et al.

(10) Patent No.: US 10,399,830 B2
(45) Date of Patent: Sep. 3, 2019

(54) HOISTING CRANE AND METHOD FOR REFURBISHING SUCH A HOISTING CRANE

(71) Applicant: ITREC B.V., Schiedam (NL)

(72) Inventors: Anne Klaas De Groot, Odijk (NL); Joop Roodenburg, Delft (NL)

(73) Assignee: ITREC B.V., Schiedam (NL)

( * ) Notice: Subject to any disclaimer, the term of this patent is extended or adjusted under 35 U.S.C. 154(b) by 275 days.

(21) Appl. No.: 15/102,688

(22) PCT Filed: Dec. 5, 2014

(86) PCT No.: PCT/NL2014/050835
§ 371 (c)(1),
(2) Date: Jun. 8, 2016

(87) PCT Pub. No.: WO2015/088332
PCT Pub. Date: Jun. 18, 2015

(65) Prior Publication Data
US 2016/0368743 A1 Dec. 22, 2016

(30) Foreign Application Priority Data
Dec. 9, 2013 (NL) .................... 2011922

(51) Int. Cl.
*B66C 23/84* (2006.01)
*B66C 23/52* (2006.01)
*F16C 19/30* (2006.01)

(52) U.S. Cl.
CPC ............ *B66C 23/84* (2013.01); *B66C 23/52* (2013.01); *F16C 19/30* (2013.01); *F16C 19/305* (2013.01)

(58) Field of Classification Search
CPC ......... B66C 23/00; B66C 23/62; B66C 23/84; B66C 23/86; F16C 33/58; F16C 33/64;
(Continued)

(56) References Cited

U.S. PATENT DOCUMENTS 2,438,542 A * 3/1948 Cushman ............... B64C 11/06
29/898.061
2,643,920 A * 6/1953 Olszewski ............. F16C 19/38
384/619
(Continued)

OTHER PUBLICATIONS

Hanse Drehverbindungen GmbH & Co. KG, "Slewing Bearing Technology", Company Brochure, Feb. 1, 2013, XP002727244, Retrieved from the Internet: URL: http://www.hanse-drehverbindungen. de/fileadmin/Hanse_Drehverbindungen/WWW-Bilder/WWW_-_HDV_Broschuere_-_englisch.pdf [retrieved on Jul. 15, 2014], 28 pages, p. 10.

*Primary Examiner* — Michael R Mansen
*Assistant Examiner* — Juan J Campos, Jr.
(74) *Attorney, Agent, or Firm* — Birch, Stewart, Kolasch & Birch, LLP

(57) ABSTRACT

A hoisting crane includes a slew bearing. The slew bearing includes a top bearing ring, a bottom bearing ring, a first row of axial load rollers and a second row of axial load rollers, which rows of axial load rollers are provided between a corresponding top roller raceway and bottom roller raceway. The top bearing ring has a top wall which extends above the first row of axial load rollers and in which at least one top entry port is provided. Furthermore, the top roller raceway of the first row of axial load rollers includes a removable raceway segment releasable attached in the top entry port. The removable raceway segment can be removed to enable access via the top entry port to the first row of axial load rollers to remove axial load rollers in a substantially vertical direction.

18 Claims, 7 Drawing Sheets

(58) Field of Classification Search
CPC ... F16C 43/04; F16C 2237/00; F16C 2300/14
USPC .......................................... 384/620; 212/253
See application file for complete search history.

(56) References Cited

U.S. PATENT DOCUMENTS

| | | | | |
|---|---|---|---|---|
| 2,908,069 A * | 10/1959 | Richardson | ............. | B66C 23/84 29/898.063 |
| 3,030,158 A * | 4/1962 | Pohler | ..................... | F16C 19/10 384/615 |
| 3,061,389 A * | 10/1962 | Bargmann | ............. | E02F 9/121 384/592 |
| 3,129,986 A * | 4/1964 | Strassberg | ............. | F16C 19/38 384/593 |
| 3,275,391 A * | 9/1966 | Blais | ..................... | F16C 19/362 384/447 |
| 3,304,137 A * | 2/1967 | Strassberg | ............. | F16C 19/381 384/455 |
| 3,361,501 A * | 1/1968 | Messinger | ............. | F16C 19/362 384/620 |
| 3,533,497 A * | 10/1970 | Richard | ................ | F16C 19/163 198/509 |
| 3,651,550 A * | 3/1972 | Bennett | ................ | F16C 19/183 29/898.09 |
| 3,888,357 A * | 6/1975 | Bauer | ..................... | B66C 23/84 212/175 |
| 3,937,540 A * | 2/1976 | Morizur | ................ | E02F 9/121 384/593 |
| 3,985,406 A * | 10/1976 | Baron | ..................... | B66C 23/84 212/253 |
| 4,126,361 A * | 11/1978 | Bottner | ................ | E02F 9/121 384/455 |
| 4,161,344 A * | 7/1979 | Delarbre | ................ | B66C 23/84 384/593 |
| 4,216,870 A * | 8/1980 | Bonneson | ............. | B66C 23/84 104/35 |
| 4,248,488 A * | 2/1981 | Sable | ..................... | B66C 23/84 212/181 |
| 4,395,140 A * | 7/1983 | Sable | ..................... | B66C 23/84 384/593 |
| 4,452,433 A * | 6/1984 | Muhlbauer | ............. | B22D 41/13 164/438 |
| 4,463,995 A * | 8/1984 | Andree | ................ | B66C 23/84 384/620 |
| 4,478,340 A * | 10/1984 | Delago | ................ | B66C 23/84 212/175 |
| 4,573,811 A * | 3/1986 | Andree | ................ | F16C 19/181 384/622 |
| 4,582,436 A * | 4/1986 | Merron | ................ | E02F 9/121 384/593 |
| 4,622,860 A * | 11/1986 | Cametti | ................ | E02F 9/121 212/175 |
| 4,789,254 A * | 12/1988 | Marquardt | ............. | F16C 19/18 384/611 |
| 4,906,113 A * | 3/1990 | Sague | ..................... | E02F 9/12 384/507 |
| 4,961,653 A * | 10/1990 | Suzuki | ................ | F16C 19/362 384/447 |
| 5,104,239 A * | 4/1992 | Sague | ..................... | F16C 19/38 29/898.01 |
| 5,403,100 A * | 4/1995 | Freitag | ................ | F16C 33/60 384/477 |
| 5,893,784 A * | 4/1999 | Boatman | ............. | B63B 21/507 114/230.12 |
| 2002/0020685 A1* | 2/2002 | Weckbecker | ........... | B66C 23/36 212/181 |
| 2003/0066370 A1* | 4/2003 | Russ | ..................... | B66C 23/84 74/414 |
| 2003/0079640 A1* | 5/2003 | Beatson | ................ | F16C 29/04 104/106 |
| 2004/0244521 A1* | 12/2004 | Russ | ..................... | B66C 23/84 74/425 |
| 2006/0216184 A1* | 9/2006 | Hanamoto | ............. | E02F 9/121 418/61.3 |
| 2007/0207663 A1* | 9/2007 | Miyazaki | ............. | B66C 23/62 439/472 |
| 2008/0169257 A1* | 7/2008 | Roodenburg | ........... | B66C 23/52 212/253 |
| 2009/0175724 A1* | 7/2009 | Russ | ..................... | F03D 1/0658 416/131 |
| 2009/0324151 A1* | 12/2009 | Craig | ..................... | F16C 19/52 384/448 |
| 2010/0012010 A1* | 1/2010 | Gooijer | ................ | B63B 21/50 114/230.1 |
| 2012/0243819 A1* | 9/2012 | Errard | ................ | F16C 19/163 384/608 |
| 2013/0206547 A1* | 8/2013 | Lurie | ..................... | B65G 65/04 198/540 |

* cited by examiner

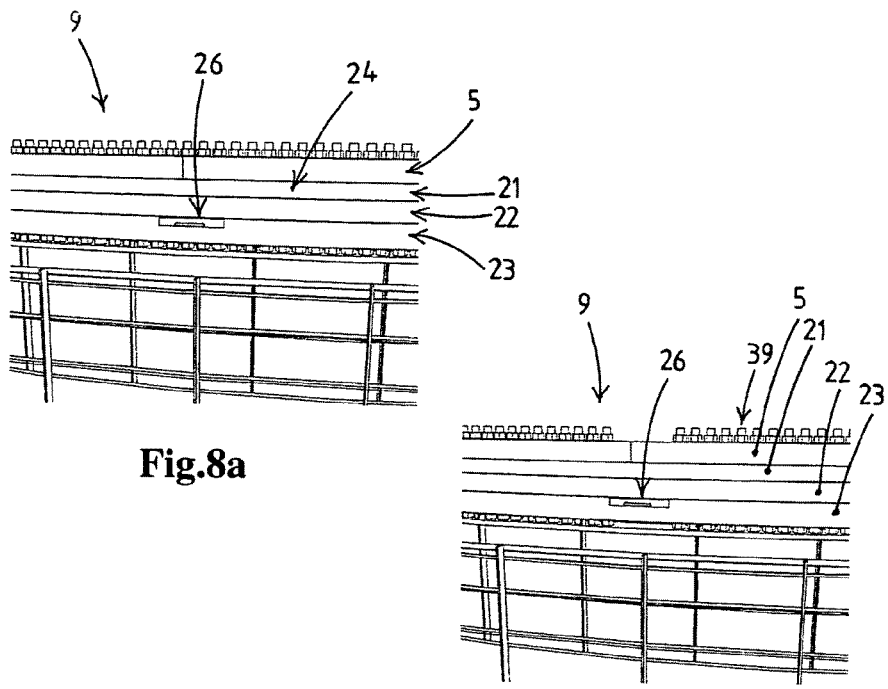
Fig.8a
Fig.8b
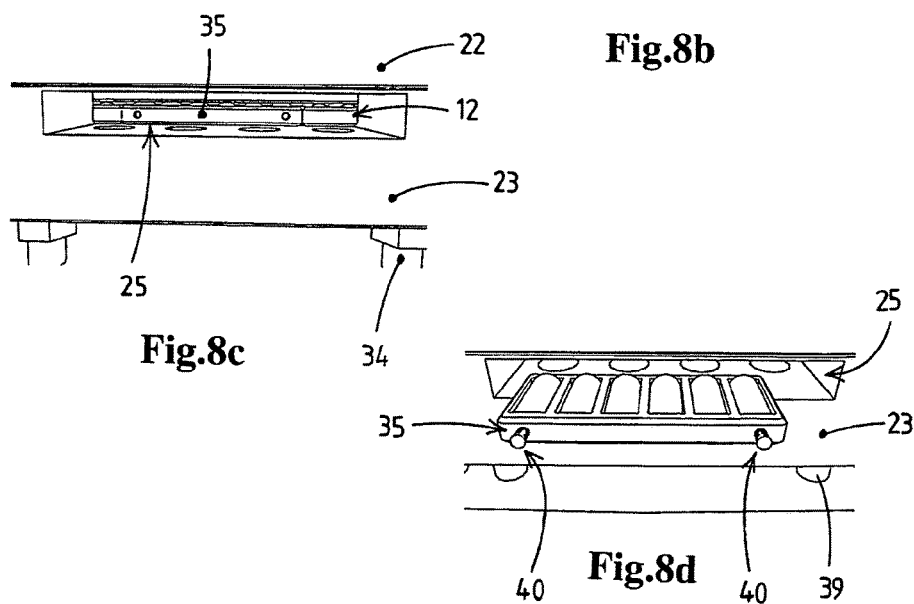
Fig.8c
Fig.8d

HOISTING CRANE AND METHOD FOR REFURBISHING SUCH A HOISTING CRANE

This invention relates to a hoisting crane, to a slew bearing for use in such a hoisting crane, and to a method for refurbishing such a hoisting crane.

Hoisting cranes are large type cranes that are for example used in the off shore industry. The cranes have a crane structure comprising a jib, which jib is often configured to be pivoted about a substantially horizontal axis. Furthermore, to correctly position the crane and to enable the cranes to transport a load from one place to another, these cranes are provided with a slew bearing. The slew bearing is provided between the crane structure and a base supporting the crane structure, and thus transmits weight loads, tilting loads and radial loads between the crane structure and the base. The slew bearing has a rotational axis that extends in an substantially vertical direction to enable the crane structure, and thus the jib, to be rotated relative to the base about the rotational axis.

These slew bearings comprise two rings and, between those rings, are provided with raceways holding rollers to enable rotational movement of the rings relative to each other. A drawback of known hoisting cranes is that maintenance, in particular refurbishment, of the slew bearings requires the slew bearings, and often the crane they are part of, to be disassembled, i.e. to be taken apart. Thus, maintenance of the bearings involves a complicated process and a substantial downtime of the crane.

It is an object of the invention to provide a hoisting crane in which the above mentioned drawbacks are eliminated altogether occur in a greatly reduced extent. In particular it is an object of the invention to provide a hoisting crane comprising a slew bearing, which slew baring allows for refurbishment of the slew bearing without taking apart the crane and/or the slew bearing.

According to the present invention, this object is achieved by providing a hoisting crane according to claim 1.

A hoisting crane according to the invention comprises a crane structure, a slew platform supporting the crane structure, a base, and a slew bearing provided between the base and the slew platform.

The crane structure comprises a jib, which jib preferably is pivotable supported such that it can be pivoted about a substantially horizontal axis.

The base supports the slew bearing, slew platform and crane structure. The base is for example a ring shaped steel pedestal secured to the hull of a vessel, for example a semi submersible.

The slew platform supports the crane structure, preferably such that the jib extends beyond a circumference of the slew platform.

The slew bearing is provided between the base and the slew platform to transmit weight loads, tilting loads and radial loads between the slew platform and the base. The slew bearing comprises a top bearing ring and a bottom bearing ring, concentric with said top bearing ring. The top bearing ring is secured to the slew platform and the bottom bearing ring is secured to the base.

To enable rotation of the top bearing ring relative to the bottom bearing ring, a first and a second row of axial load rollers are provided between the rings. The rows of axial load rollers are each provided between a corresponding top roller raceway and bottom roller raceway, which top and bottom roller raceways are each connected to one of the bearing rings. The first row of axial load rollers is provided to transmit axial loads in a substantially downward direction between the first and second bearing ring. These forces are associated with weight loads, for example the weight of the crane structure and of an object lifted by the crane. The second row of axial load rollers is provided to transmit axial loads in a substantially upward direction between the first and second bearing ring. These forces are associated with tilting loads, for example as a consequence of the crane supporting a lifted object using a jib.

The slew bearing is furthermore provided with guides between the two bearing rings, for example in the form of substantially vertical low friction surfaces, load rollers, guide strips, etc, for transmitting radial loads in a horizontal direction between the two bearing rings. These guides also position the two bearing rings concentrically relatively to each other.

The slew bearing has a rotational axis that extends in a substantially vertical direction. When the top bearing ring is rotated relative to the bottom bearing ring, or visa versa, the bearing ring rotates about that rotational axis. The rotational axis of the slew bearing ring is thus concentric with the top bearing ring and the bottom bearing ring.

The bearing allows the slew platform, and thus the crane structure comprising the jib, to be rotated relative to the base and about the rotational axis of the bearing. By rotating the crane about the rotational axis the jib of the hoisting crane, and thus for example a hook of the hoisting crane, can be positioned above a load. Also, an object lifted by the crane can be moved from a first to a second location by rotating the crane structure about the rotational axis.

According to the invention, the top bearing ring has a top wall, which top wall extends above the first row of axial load rollers and in which top wall at least one top entry port is provided to allow access, from above, to the first row of axial load rollers. In addition, according to the invention the top roller raceway of the first row of axial load rollers comprises a removable raceway segment releasable attached in the top entry port, for example is releasable attached to the top wall or to another part of the top bearing ring in which the side port is provided. The removable roller raceway segment can be removed from said top entry port to enable access via said top entry port to the first row of axial load rollers. Furthermore, the top entry port and the removable raceway segment are dimensioned such that, when the removable roller raceway segment has been removed, via the top entry port axial load rollers can be removed, and thus replaced, in a substantially vertical direction from the first row of axial load rollers.

The top entry port is provided above the first row of axial load rollers. When the hoisting crane is in use, the removable raceway segment is secured in the top entry port and forms part of the top roller raceway of the first row of axial load rollers. Thus, the top roller raceway crosses the top entry port. When the crane structure is rotated with the removable raceway segment secured in the entry port, the removable raceway segment forms an integral part of the top roller raceway and thus guides axial load rollers across the top entry port.

For maintenance, control and/or refurbishment purposes the removable raceway segment is removed from the top entry port to allow direct access to axial load rollers of the first row of axial load rollers.

It is noted that the removable raceway segment can be provided in the form of a single body element. For example, the removable raceway segment can be provided in the form of a steel plug that fits the top entry port, and which steel plug is provided with a hardened bottom surface that functions as the actual raceway. For securing the plug in the top entry port, for example the plug and the top wall of the bearing ring can be provided with openings, which openings are in line with each other when the plug has been correctly positioned in the top entry port. By subsequently passing rods or bolts through the openings, the steel plug can be secured in the top entry port with its bottom surface continuing the top roller raceway across the top entry port. Thus, with the removable raceway segment in place, the top roller raceway guides axial load rollers of the first row of rollers across the top entry port, and the crane is ready for use.

Alternatively, the removable raceway segment can comprise several elements. For example, the removable raceway segment can comprise a raceway element which when in use forms part of the top roller raceway for guiding the axial load rollers, a hatch, which hatch in use is secured in the top entry port to secure the removable raceway elements in the top entry port, and a filler element, which filler element in use is provided between the raceway element and the hatch to secure the railway element to the hatch such that the railway element is correctly positioned in the top entry opening to form part of the top entry port. Such an embodiment of the removable raceway segment allows for replacing only one element. For example, when the raceway element is worn out or damaged, it can be replaced. The new raceway element is than used with the "old" hatch and filler segment. Thus, the costs of refurbishing the raceway segment can be kept low compared to replacing a single body replaceable raceway segment.

The slew bearing according to the invention allows for direct access to the axial load rollers of the first row of axial load rollers. Via the top entry port, the rollers can be inspected and, if needed replaced. Furthermore, by rotating the crane the top entry port can be moved along the rollers of the first row of axial load rollers. Thus, with a slew bearing according to the invention the axial load rollers of the first row of axial load rollers can all be inspected and replaced without the need of taking apart the bearing.

It is noted that in practice one top entry port may suffice. However, it has been found that the distribution of the load transferred by the bearing allows for two optimal positions for providing an entry port according to the invention. Thus, in an embodiment according to the invention, two top entry ports are provided.

Furthermore, in an embodiment according to the invention, the slew bearing is provided with multiple first rows of axial load rollers, each of these first rows provided between the upper and lower bearing ring to transmit loads in a substantially downward direction, and each of these first rows is provided with at least one top entry port and/or entry ports are provided that allow access to two or more parallel first rows of axial load rollers.

In a further embodiment of a hoisting crane according to the invention, the bottom bearing ring comprises a flange section which extends in the radial direction and the top bearing ring has a substantially C-shaped cross section, having an top section, comprising the top wall with the at least one top entry port, a mid-section and a bottom section. In such an embodiment the top bearing ring engages the flange section of the bottom bearing ring such that its top section, i.e. the upper leg of the C-shape when seen in cross section, extends above the flange section of the bottom bearing ring and the bottom section, i.e. the lower leg of the C-shape when seen in cross section, extends below the flange section of the bottom bearing ring.

Furthermore, in such an embodiment the first row of axial load rollers is provided between the top section of the top bearing ring and the flange section of the bottom bearing ring, with the top and bottom roller raceways attached to the top bearing ring and the bottom bearing ring respectively. The second row of axial load rollers is provided between the bottom section of the top bearing ring and the flange section of the bottom bearing ring, with the top and bottom roller raceways attached to the bottom bearing ring and the top bearing ring respectively.

Thus, the first and second row of axial rollers are located on opposite sides of the flange section. In a further embodiment, the first and second row of axial rollers are positioned directly above each other, such that axial forces transferred between the top bearing ring and the bottom bearing ring via the first row of axial load rollers and axial forces transferred between the top bearing ring and the bottom bearing ring via the second row of axial load rollers extend in the same vertical cylindrical plane.

In an embodiment, the flange section of the bottom bearing ring extends in the radially outward direction. In such an embodiment, the opening of the C-shaped cross section is directed towards the rotational axis of the bearing and the mid-section of the top bearing ring is directed radially outward.

In an alternative embodiment, the flange section of the bottom bearing ring extends in the radially inward direction. In such an embodiment, the opening of the C-shaped cross section is directed radially outward and the mid-section of the top bearing ring is directed radially towards the rotational axis of the bearing.

In an embodiment of a hoisting crane according to the invention the top bearing ring has a circumferential side wall, which side wall extends alongside the second row of axial load rollers. According to the invention, in this embodiment in the side wall at least one side entry port is configured to allow access, in a lateral direction, to the second row of axial load rollers. In each side entry port a removable insert is provided, which is releasable attached in the side entry port, i.e. is releasable attached to the side wall or to another part of the bearing ring in which the side port is provided. As is the case with the removable railway segment of the top entry port, the insert of the side entry port can be a single body element, or may comprises multiple elements which together form the removable insert.

In an embodiment, the circumferential side wall comprising the side entry port is part of the top bearing ring, the top bearing ring having a C-shaped cross section. In such an embodiment, the side entry port is preferably provided in a side wall that is part of the mid-section of the C-shaped cross section.

Preferably the side wall guides the axial load rollers in a circumferential direction. In this preferred embodiment, the wall can be provided with guides, such as guide strips, or have a surface suitable for guiding the axial load rollers. In an embodiment in which the axial load rollers are provided in roller bodies cages that position the axial load rollers at a mutual distance, each roller bodies cage holding two or more axial load rollers, the side wall is provided with a guide surface or with guides, such as guide strips, for guiding those roller bodies cages.

In case the side wall is configured to guide the axial load rollers, or the axial load roller bodies cages, the insert has a guide surface that, when the insert is provided in the side entry port, is part of the circumferential side wall for guiding the axial load rollers in the circumferential direction. Thus, the insert can be provided with guides, such as guide strips, or have a surface suitable for guiding the axial load rollers or roller bodies cages comprising those axial load rollers.

In an alternative embodiment of a hoisting crane according to the invention, the at least one side entry port is provided in a circumferential side wall of the bottom bearing, which bottom bearing side wall extends alongside the second row of axial load rollers and preferably guides these axial load rollers in a circumferential direction.

In any configuration of this embodiment, the side entry port is dimensioned such that, when the removable insert has been removed from the side entry port, via the side entry port axial load rollers can be removed and replaced in a substantially lateral direction from the second row of axial load rollers. In a further embodiment, the axial load rollers are provide in roller bodies cages to position the axial load rollers relative to each other, each roller bodies cage comprising multiple axial rollers. In such an embodiment, the side entry port is dimensioned such that a roller bodies cage, the roller bodies cage holding two or more axial load rollers, can be replaced via the side entry port.

Providing a side entry port according to the invention allows for direct access to the axial load rollers of the second row of axial load rollers. Via the side entry port, the rollers can be inspected and, if needed replaced. Furthermore, by rotating the crane the side entry port can be moved along the rollers in the second raceway. Thus, with such a slew bearing the axial load rollers of the first row of axial load rollers can all be inspected and replaced via the top entry port and the axial load rollers of the second row can all be inspected and replaced via the side entry port, all without the need of taking apart the bearing.

In a further embodiment, the side entry port is dimensioned such that it also exposes the sides of the upper and/or lower raceways, which raceways comprise raceway segments which can be slid in a lateral direction through the side entry port opening. For example, when the side entry port is provided in a side wall of the top bearing ring, rotating the crane structure about its rotational axis moves the side entry port along the upper raceway of the second row of axial load rollers. Providing an upper raceway comprising sections that can be slid into and out off position in a lateral direction, and a side entry port that is dimensioned such that the upper raceway sections can be passed through it, allows for refurbishing the entire upper raceway without the need of taking apart the crane and/or bearing.

It is noted that multiple side entry ports may be provided. However, it has been found that the load distribution transferred by the bearing allows for one optimal position for providing a side entry port according to the invention, which position is located below the jib.

In an embodiment according to the invention, the top bearing ring has a C-shaped cross section of which the bottom section comprises multiple semi-circular bottom section segments, each extending along part of a circumference of the top bearing ring. The semi-circular bottom section segments are releasable attached to the midsection and the top section of the top bearing, such that each one can be removed, preferably while the other segments remain attached to the bearing ring, to expose part of the second row of axial load rollers and part of the upper and lower roller raceway guiding the second row of axial load rollers. When such a bottom section segment has been removed, the exposed rollers and the parts of the upper and lower raceways that are exposed can be replaced if needed.

Thus, this embodiment allows for the raceways for guiding the second row of axial load rollers to be refurbished while the top bearing ring is supported, via the first row of axial load rollers, on the bottom bearing ring. It is thus not necessary to disassemble the entire bearing or to the remove the crane structure from the bearing when the raceways of the second row of axial load rollers needs to be replaced. This saves time and effort.

It is however noted that, in contrast with the side entry port, removing such a bottom segment does not allow for rotating the crane to expose other axial load rollers of the second row. To expose other axial load rollers or raceway segments of the second row or rollers, another semi-circular bottom section segment should be removed.

In a an embodiment in which one bearing ring comprises a flange section which extends in the radial direction, preferably the radially outward direction, and the other bearing ring has a substantially C-shaped cross section engaging the flange section, the flange section has at its end a substantially vertical guide surface, and the bearing ring with the substantially C-shaped cross section had a midsection that forms a circumferential wall extending along the substantially vertical guide surface of the flange section. In this embodiment, between the substantially vertical guide surface and the midsection preferably guides, for example guide strips or anti-friction elements, are provided for supporting radial loads.

In a further embodiment, the mid-section of the bearing ring with the C-shaped cross section comprises multiple semi-circular segments, each extending along part of a circumference of the bearing ring, which semi-circular segments are releasable attached to the bottom section and the top section of that bearing ring, preferably the top bearing ring. Thus, the semi-circular segments can be removed to expose part of the substantially vertical guide surface and the guides, which allows for inspection and refurbishment thereof.

In an embodiment, the top bearing ring has a C-shaped cross section and comprises semi-circular bottom section segments. In a further embodiment, the top bearing ring also comprises semi-circular mid-section segments. The semi-circular bottom section segments are attached to the mid-section and/or the top section to form a functional top bearing ring. When the top bearing ring also comprises semi-circular mid-section segments, the semi-circular bottom section segments and the semi-circular mid-section segments are attached to the top section of the top bearing ring to form a functional top bearing ring.

In an embodiment, the top section, the mid-section and the bottom section are provided with substantially vertical openings. These vertical openings are indexed openings, i.e. when the semi-circular bottom section segments and, if provided, the semi-circular mid-section segments are in the correct position to form the bearing ring, the vertical openings are in line and bolts, preferably stud bolts, are passed through them to clamp the semi-circular bottom section segments and/or the semi-circular mid-section segments against the top section of the top bearing ring.

In a further embodiment, the slew bearing platform is also provided with openings for receiving bolts, preferably stud bolts, which openings are indexed with the above mentioned openings such that the strut bolts used for clamping the semi-circular segments to the top section of the bearing ring at the same time clamp the slew bearing platform against the top bearing ring.

In an embodiment, the top bearing ring comprises semi-circular bottom section segments and semi-circular mid-section segments. To compose a relatively stiff top bearing ring, the semi-circular mid-section segments and the semi-circular bottom section segments are positioned relative to each other such that they overlap, more in particular overlap in the circumferential direction. Thus, when they are clamped to the top section of the bearing ring, for example using stud bolts, the semi-circular lower segment sections lie head to head at other locations than the semi-circular mid-section segments.

For example, when a bearing ring has a C-shaped cross section and comprises semi-circular mid-section segments and semi-circular bottom section segments, the segments are preferably provided such that they overlap each other in the circumferential direction, and are mounted to the top section of the bearing ring using indexed through holes and strut bolts, which extend through the bottom, the mid-section and the top section, This allows for removing one semi-circular segment at the time. For example, when the strut bolts supporting a semi-circular mid-section are removed, these strut bolts are also removed from the through holes of the overlapping parts of the two overlapping semi-circular bottom sections. The latter are however still supported by the strut bolts mounted in the trough holes of the parts that overlap with the adjacent semi-circular mid sections. Thus, the semi-circular mid-section of which the strut bolts have been removed can be removed from the bearing ring while the two overlapping semi-circular bottom sections remain in place and attached to the bearing ring.

In a further embodiment, the semi-circular mid-sections overlap with the semi-circular bottom sections, in the circumferential direction, and are shorter than the semi-circular bottom section segments. For example, the semi-circular mid-sections each extend over an angle of 30 degrees while the semi-circular bottom sections extend over an angle of 60 degrees. To form the top bearing, the semi-circular mid-sections are positioned relative to the semi-circular bottom sections such that that they overlap them, i.e. a semi-circular mid-section segment is located above the location where two semi-circular bottom sections lie head to head.

In an embodiment according to the invention, the slew platform and the jib are essentially symmetric relative to a vertical plane of symmetry, which vertical plane of symmetry comprises the pivot axis of the slew bearing. Thus, the plane of symmetry divides both the slew bearing and the crane structure, the crane structure comprising the jib, into two substantially similar halves. Such a configuration of a hoisting crane is not uncommon in the prior art. Typically the hoisting wire of the crane lies in the plane of symmetry also or runs substantially parallel thereto.

In an embodiment according to the invention, the hoisting crane is provided with two top entry ports, which top entry ports are provided each on one side of the plane of symmetry, preferably are provided symmetrically relative to the plane of symmetry.

The first row of axial load rollers is provided to mainly support axial load forces due to the weight of the crane structure. It is observed that these vertically downward directed forces are partially cancelled by the vertical upward directed forces related to the tilting load caused by the jib of the hoisting crane. It is observed that due to the interaction of these two types of loads, the axial forces exerted on the first row of axial load rollers has a minimum, more in particular is essentially none existent, in two locations located on opposite sides of the above mentioned plane of symmetry. The top entry ports are preferably provided each near, preferably at, such a location.

It is noted that the locations where the axial load exerted on the axial load rollers of the first row of rollers depends on the configuration of the jib and crane structure, more in particular depends on the tilting load generated by the jib.

In an embodiment of a hoisting crane according to the invention, the axial forces transferred through the first row of axial load rollers is minimal at or near a vertical plane extending perpendicular to the plane of symmetry and comprising the rotational axis of the slew bearing. In this embodiment, the top entry ports are located in the top bearing ring such that they are intersected by that perpendicular extending plane, preferably are located such that they both extend symmetrical on opposite sides of that plane. By providing the top entry ports at these locations, no or only a comparatively small force is neded to insert and attach the removable railway segment inside the top entry port.

In an embodiment according to the invention, the rollers of the first row of axial load rollers are provided in roller bodies cages, which roller bodies cages position the rollers relative to each other. By providing these roller bodies cages the axial load rollers are prevented from running in to each other. It is noted that providing axial load rollers in such cases is known from the prior art. Typically, each roller bodies cage holds at least two rollers, preferably holds at least four rollers, for example holds six cylindrical roller bodies.

According to the invention, the top entry port is dimensioned such that the roller bodies cage with its rollers can be removed and replaced via said top entry port.

In an embodiment, the rollers of the second row of axial load rollers are provided in such roller bodies cages. In such an embodiment, the side entry port is dimensioned such that the roller bodies cage with its rollers can be removed and replaced via said side entry port.

In an embodiment, the bearing is provided with one side entry port, which side entry port is located below and in line with the jib. It has been found that at this location the axial forces transferred by the second row of axial load rollers are lowest. In a further embodiment, the slew platform and the jib are essentially symmetric relative to a vertical plane of symmetry, as described above, and the side entry port is provided such that it is intersected by the plane of symmetry, preferably such that it extends symmetrical on opposite sides of that plane.

The second row of axial load rollers is provided to mainly support axial load forces of a tilting load generated by the jib, and optionally by a load supported by the hoisting crane. This tilting load is maximal at the side of the slew bearing opposite the jib and minimal below the jib. By providing the side entry port below the jib, the side entry port provides access to the second row of axial load rollers where the compressive forces exerted on those axial load rollers are minimal. This allows for the axial load rollers to be removed from between the upper and bottom bearing ring, more in particular from between the upper and lower raceways with comparatively little effort.

In a further embodiment, the slew bearing platform comprises a ring shaped wall located vertically above the first row of roller bearings, which ring shaped wall supports the crane structure. By locating the ring shaped wall directly above the first row of axial load rollers, the vertical loads are transferred from the top bearing ring via the axial load rollers to the bottom bearing ring in a substantially vertical direction, i.e. without generating an additional moment load in the top wall of the top bearing ring.

In a further embodiment, when seen in a cross sectional view, the first and second row of axial load rollers are positioned vertical above each other, and the ring shaped wall is located vertically above the rows of axial load rollers. Thus, the contact surfaces, in the form of the axial load rollers, between the two bearing rings are in line with the ring shaped wall via which the loads exerted by the crane are transferred onto the bearing ring. Providing the axial load rollers on a vertical line with the circular wall thus allows for a minimum of bending moments in the bearing layer, which in turn reduces wear of the bearing.

In a further embodiment, the slew bearing platform, more in particular the vertical wall of the slew bearing platform, is provided with an opening above each top entry port, which opening provides access to the top entry port.

In a further embodiment, the slew bearing platform is configured for securing the removable raceway segment in the top entry port. For example, when the removable raceway segment comprises a hatch for securing and/or supporting the removable raceway section in the respective top entry port, the hatch and the slew bearing platform, can be provided with openings for receiving bolts, preferably stud bolts, to clamp the hatch against the slew bearing platform and thus secure the removable raceway segment in the top entry port.

In an embodiment, the base of the crane comprises a tub, which tub is provided with openings for receiving bolts, preferably stud bolts, to clamp the slew bearing platform, and thus the base, against the bottom bearing ring.

It is noticed that the invention is particular beneficial when used with large hoisting cranes used in the of shore industry. Due to their size and due to there location of use these types of cranes are difficult to take apart to replace parts of the bearings. A hoisting crane according to the invention preferably is configured for lifting loads of at least 5000 mt, preferably of at least 8000 mt, for example of 10.000 mt, and preferably has a slew bearing with a diameter of at least 25 m, preferably is at least 28 m, for example is about 30 m.

The invention furthermore provides a vessel provided with a hoisting crane according to the invention, and a slew bearing configured for use with such a hoisting crane.

The invention furthermore provides a method for replacing axial load rollers off a hoisting crane according to the invention, the method comprising the steps:
a) detaching and removing the hatch covering the top entry port of the top bearing ring;
b) detaching and removing the removable top roller raceway segment located in line with the top entry port, and optionally removing any filler bodies provided in the entry port, to provide access to the first row of axial load rollers;
c) remove one or more axial load rollers of the first row of rollers, preferably remove multiple rollers by removing a roller bodies cage holding two or more rollers, from the lower raceway;
d) optionally, remove and replace a lower raceway segment;
e) replace one or more axial load rollers, preferably replacing multiple axial load rollers by placing a roller bodies cage holding two or more rollers, on the lower raceway segment;
f) optionally: rotate the crane about the substantial vertical rotational axis of the bearing to expose one or more other rollers and repeat steps c, d and e;
g) replace and attach the removable top roller raceway segment located in line with the top entry port, and optionally place any filler bodies provided in the entry port;
a) replace and attach the hatch to cover the top entry port of the cylinder wall and/or the top bearing ring, Advantageous embodiments of the hoisting crane according to the invention and the method according to the invention are disclosed in the subclaims and in the description, in which the invention is further illustrated and elucidated on the basis of a number of exemplary embodiments, of which some are shown in the schematic drawing.

In the drawings
FIG. 1 shows a perspective view of a vessel provided with two hoisting cranes according to the invention;
FIG. 2 shows a side view of a hoisting crane of FIG. 2;
FIG. 3 shows a cross sectional view of a slew bearing of a hoisting crane according to the invention;
FIG. 4 shows the slew bearing of FIG. 3 with a removable raceway segment removed from a top entry port;
FIGS. 5*a-e* show subsequent steps involved with removing a roller bodies cage with axial load rollers via a top entry port according to the invention;
FIG. 6 shows a top view of a top entry port according to the invention;
FIG. 7 shows a schematic top view of a slew bearing according to the invention;
FIGS. 8*a*-8*d* show subsequent steps involved with removing a roller bodies cage with axial load rollers via a side entry port according to the invention;
FIG. 9 shows a cross sectional view of a slew bearing of a hoisting crane according to the invention with a semi-circular bottom section removed;
FIG. 10 shows a side view of the slew bearing of FIG. 9;
FIG. 11 shows a perspective view an alternative slew bearing of a hoisting crane according to the invention with a semi-circular bottom section removed
FIG. 12 shows a cross sectional view of a slew bearing of a hoisting crane according to the invention with a semi-circular mid-section removed;
FIG. 13 shows a side view of the slew bearing of FIG. 12;
FIG. 14 shows cross sectional view of an alternative bearing according to the invention; and
FIG. 15 shows cross sectional view of a second alternative bearing according to the invention.

FIG. 1 shows a perspective view of a vessel 41 provided with two hoisting cranes 1 according to the invention. FIG. 2 shows a side view of one of the two hoisting cranes shown in FIG. 1. The hoisting 1 crane comprises a crane structure 2, which crane structure comprises a jib 3. In the embodiment shown, the jib 3 can be pivoted about a substantially horizontal pivot axis 4.

The crane structure 2 is mounted on a slew platform 5. To support the slew platform 5 and the crane structure 2 mounted thereon, a base 6 is provided, which base is secured to the vessel 41. To enable rotation of the crane structure 2 about a vertical axis, the hoisting crane 1 is provided with a slew bearing 7. The slew bearing 7 has a rotational axis 8 that extends in a substantially vertical direction and allows the slew platform, and thus the crane structure 2 comprising the jib 3, to be rotated relative to the base about that rotational axis.

FIG. 3 shows a cross sectional view of the slew bearing 7 of the hoisting crane 2. The slew bearing 7 is provided between the base 6 and the slew platform 5, and comprises a top bearing ring 9 which is secured to the slew platform 5 and a bottom bearing ring 10, concentric with the top bearing ring 9, which is secured to the base 6. Weight loads, tilting loads and radial loads are transmitted between crane structure and vessel, more in particular between slew platform and base, via the slew bearing.

To enable rotation of the top bearing ring 9 relative to the bottom bearing ring 10, a first row of axial load rollers 11 and a second row of axial load rollers 12 are provided between the top bearing 9 ring and the bottom bearing ring 10. The rows of axial load rollers are each provided between a top roller raceway 13,14 and corresponding bottom roller raceway 15,16, which top and bottom roller raceways are each connected to one of the bearing rings.

In the particular embodiment shown, the top bearing ring 9 has a C-shaped cross section, comprising a top section 21, a mid-section 22 and a bottom section 23, and the bottom bearing ring 10 comprises a flange section 20 which extends in the radial direction, in the embodiment shown the radially outward direction.

The top bearing ring 9 engages the flange section 20 of the bottom bearing ring 10 such that its top section 21 extends above the flange section 20 of the bottom bearing ring 10 and the bottom section 23 extends below the flange section 20 of the bottom bearing ring 10.

The first row of axial load rollers 11 is provided between the top section 21 of the top bearing ring 9 and the flange section 20 of the bottom bearing ring 10, with the top roller raceway 13 and the bottom roller raceway 15 attached to the top bearing ring 9 and the bottom bearing 10 ring respectively.

The second row of axial load rollers 12 is provided between the bottom section 23 of the top bearing ring 9 and the flange section 20 of the bottom bearing ring 10, with the top roller raceway 14 and bottom roller raceway 16 attached to the bottom bearing ring 10 and the top bearing ring 9 respectively.

According to the invention, the slew bearing 7 is provided with at least one top entry port 18, in the particular embodiment shown two top entry ports, to allow access, from above, to the first row of axial load rollers 11. The top entry ports 18 are provided in a top wall 17 of the top bearing ring 9, which top wall extends above the first row of axial load rollers 11.

Furthermore, the top roller raceway 13 of the first row of axial load rollers 11 comprises removable raceway segments 19, each releasable attached in a top entry port 18. These removable roller raceway segments 19 can be removed from said top entry port 18 to enable access via said top entry port to the first row of axial load rollers 11.

FIG. 4 shows the slew bearing 7 of FIG. 3 with the removable raceway segment 19 removed from a top entry port 18.

The removable raceway segment 19 shown comprises several elements. In the particular embodiment shown the removable raceway segment comprises a raceway element 191, a liner element 192, a filler element 193 and a hatch 194. When secured in the top entry port 191, as shown in FIG. 3, the liner element 192 is embedded in the raceway element 191, the hatch 194 is secured with bolts such that it covers the top entry port 18, and the filler element is provided between the hatch 194 and the raceway element 191 such that the latter, more in particular the liner element 192, is correctly positioned with respect to the upper raceway 13 on opposite sides of the top entry port 18 for guiding axial load rollers.

According to the invention, the top entry port 18 end the removable raceway segment 19 are dimensioned such that, when the removable roller raceway segment 19 has been removed, via the top entry port axial load rollers can be removed and replaced in a substantially vertical direction from the first row of axial load rollers.

FIG. 6 depicts a top view of the top entry port 18 of FIG. 4, with the removable raceway segment 19 removed. The top entry port 18 provides a view of a roller bodies cage 35, the roller bodies cage comprising six roller bodies, and two end sections of adjacent roller bodies cages. From FIG. 6 it is clear that the tope entry port is wide enough to remove the roller bodies cages 35 from its location in the bearing. FIG. 3 shows the frontal view of the roller bodies cage 35 located between the top roller raceway 13 and the bottom roller raceway 15. FIG. 4 shows the roller bodies cage 35 removed via the top entry port 18.

FIGS. 5a-5f each show a perspective view of the section of the slew bearing 7 in which the top entry port 18 is provided. The series of Figs shows the subsequent steps involved with removing the roller bodies cage 35 from the slew bearing 7. First, the hatch 194 is detached from the top bearing ring 9, and is subsequently lofted and removed from the top entry port 18, which process is shown in FIGS. 5a, 5b and 5c respectively. After the hatch 194 has been removed, the filler element 193, the raceway element 191 and the loner element 192 are lifted from the top entry port and removed, which is depicted in FIG. 5d. Finally, the roller bodies cage 35 is lifted form its location the in the slew bearing 7.

After they have been removed, the elements, roller bodies cage and roller bodies can be thoroughly inspected and replaced with new ones if required. After the roller bodies cages has been replaced, the crane structure can be rotated about its vertical axis to position other roller bodies cages in line with the top entry port to be inspected and replaced if needed. In an embodiment, the bottom roller raceway 15 of the first row of axial load rollers is provided with removable raceway elements and/or liner elements that can be replaced when a roller bodies cage is taken out. Thus, the bottom raceway can also be refurbished via the top entry port. After the inspection and refurbishment have been finished, the removable raceway segment is again secured in the top entry port and the hoisting crane is ready for use.

Thus, the slew bearing 7 shown allows for direct access to the rollers of the first row of axial load rollers 11, such that the rollers can be inspected and, if needed replaced. Furthermore, by rotating the crane structure about the rotational axis the top entry port 18 can be moved along the rollers first row of axial load rollers 11. Thus, the slew bearing 7 allows for the axial load rollers of the first row of axial load rollers 11 to be inspected and replaced without the need of taking apart the bearing.

The slew bearing 7 of the hoisting crane 1 shown is provided with two top entry ports. FIG. 7 shows a schematic top view of the slew bearing 7, the crane structure 2, and the two top entry ports 18. The two top entry ports can be used simultaneously for inspecting and refurbishing the first row of axial rollers and/or the bottom roller raceway of the first row of axial load rollers. This allows for a significant cut in time needed for inspecting and refurbishing.

The two top entry ports 18 are provided on opposite sides of a vertical plane of symmetry 34 which vertical plane of symmetry comprises the pivot axis of the slew bearing 7. It is noted that the slew platform 5 and the jib 3 are essentially symmetric relative to the vertical plane of symmetry. The two top entry ports 18 are provided each on one side of the plane of symmetry, and symmetrically relative to the plane of symmetry, at the locations where the axial force exerted upon the axial load rollers is minimal.

It noted that in the exemplary embodiment shown, the top bearing ring 9 is supporting a slew platform 5, which slew platform is provided with openings indexed with the top entry port 18 of the top bearing ring 9. Thus, the slew platform openings provide access to the top entry port. Alternatively, the slew platform is for example composed out of segments which only partially cover the upper wall of the top bearing ring, or otherwise allow direct access to any of the top entry ports provided in the top bearing ring.

It is furthermore noted that the slew platform 5 comprises a ring shaped wall 37, which is located vertically above the first row of axial load rollers 11, which is clearly shown in the cross sectional view of FIG. 3. Also, the first and second row of axial load rollers are positioned vertical above each other, and thus the ring shaped wall is located vertically above the rows of axial load rollers. Therefore, the contact surfaces, in the form of the axial load rollers, between the two bearing rings are in line with the ring shaped wall via which the loads exerted by the crane are transferred onto the bearing ring. Providing the axial load rollers on a vertical line with the circular wall thus allows for a minimum of bending moments in the bearing layer, which in turn reduces wear of the bearing.

In the particular embodiment shown in the FIGS. 1-6 the top bearing ring 9 has a circumferential side wall 24, which side wall extends along the second row of axial load rollers 12 and guides these axial load rollers in a circumferential direction. According to the invention, the side wall 24 is provided with at least one side entry port 25 configured to allow access, in a lateral direction, to the second row of axial load rollers 12. In the particular embodiment shown, the side entry port is provided in the bottom section 23 of the top bearing ring 9.

FIGS. 8a-d show a perspective view of part of the slew bearing 7 in which the side entry port 25 is provided. The side entry port is provided in a semi-circular bottom section segment.

According to the invention, the side entry port 25 is provided with a removable insert 26. The removable insert 26 has a guide surface 27 that is part of the circumferential side wall 24 in which the entry port 25 is provided. The guide surface 27 of the insert is configured for guiding the axial load rollers of the second row of axial rollers 12 in the circumferential direction. Therefore, the insert is either provided with a surface fit for guiding the axial load rollers, or the roller bodies cages, or can be provided with guides, such as low friction strips, etc.

As is the case with the removable raceway segment according to the invention, a side entry port insert van be configured as a single body element or as can comprises several elements, such as for example a low friction guide, an insert and a hatch. Furthermore, as is the case with the removable raceway segment, the side entry port insert can be removed from the entry port it is provided in without the need of taking apart the bearing, more in particular without removing any segments, such as semi-circular mid-section segments or semi-circular bottom segments, that are part of the bearing.

Also, the side entry port is dimensioned such that, when the removable insert has been removed from the side entry port, via the side entry port axial load rollers or the roller bodies cages they are provided in, can be removed and replaced in a substantially lateral direction from the second row of axial load rollers.

The FIGS. 8a-d show the subsequent steps involved in removing a roller bodies cage 35 from the second row of rollers 12. In the embodiment shown, the side entry port insert is provided with vertical openings, which when the side entry port insert is correctly located in the side entry port are indexed with the vertical openings provided in the semi-circular segments for receiving the bolts to keep the bearing ring together. Thus, these bolts can be sued to secure the side entry port insert in the side entry port.

FIG. 8a shows the removable insert 26 releasable secured in the side entry port 25. In this condition, the removable insert guides the roller cage bodies. In FIG. 8b the bolts that secured the side entry port insert in the side entry port have been removed to allow for the insert to be removed. In FIG. 8c the side entry port insert has been removed, which provided a view of the roller bodies cages of the first second row of roller bodied. It is also clear from FIG. 8c that the side entry port is dimensioned such that a roller bodies cage can be removed in a lateral direction from the bearing. FIG. 8d shows a roller bodies cage, which is provided with grip elements to facilitate engagement of the cage by hand, taken from the bearing.

In an alternative embodiment of a slew bearing according to the invention, the bottom bearing ring is provided with a circumferential side wall that extends along the second row of axial load rollers and guides these axial load rollers in a circumferential direction. In such an embodiment, the at least one side entry port can be provided in this side wall of the lower bearing ring to allow access, in a lateral direction, to the second row of axial load rollers.

The side entry port 25 is located below and in line with the jib, which is indicated in FIG. 7. The side entry port is thus provided at the location where the axial loads exerted upon the axial load rollers of the second row of axial load rollers is minimal. This allows for removing the rollers form between the raceways without the need of taking the bearing apart. In the embodiment shown, the side entry port is provided located in the bearing such that it is intersected by a vertical plane of symmetry 34 which vertical plane of symmetry comprises the pivot axis of the slew bearing 7. It is noted that the slew platform 5 and the jib 3 are essentially symmetric relative to the vertical plane of symmetry.

In the particular embodiment of a slew bearing according to the invention, the cylindrical rollers of the first and second row of axial load rollers are provided in roller bodies cages 35, which roller bodies cages position the rollers relative to each other. Each roller bodies cage hold six cylindrical roller bodies. Furthermore, in the embodiment shown, the roller bodies cages are configured for receiving grips to facilitate removing the cages from and inserting the cages into the bearing via an entry port. In an alternative embodiment, the cages are provided with integrated grip elements.

It is noted that large size slew bearings typically comprise slew bearing rings that comprise multiple semi-circular segments which are clamped together to form the bearing ring. This because the bearing rings are too large to be machined out of a single piece of material. When the bearing rings need maintenance and or need to be refurbished, the rings are taken apart again.

According to the invention these bearing ring segments are provided with one or more entry ports, which entry ports allow maintenance and refurbishment of at least part of the slew bearing without the need of taking it apart, more in particular without the need of taking the bearing rings apart.

Furthermore, in an embodiment according to the invention, one of the bearing rings is configured such the segments can each be removed and replaced without taking the ring apart, while the segments are designed to cover sections of guide surfaces and/or raceways such that removal of the segment allows for maintenance and refurbishment of the uncovered guide surface and or raceway section. To enable the latter, the segments are part of, or directly support, guide surfaces and/or raceways.

The exemplary embodiment of a slew bearing according to the invention shown in FIGS. 3-13 comprises a top bearing ring 9 which has a top section 21 comprising multiple semi-circular top section segments, a mid-section 22 comprising multiple semi-circular mid-section segments and a bottom section comprising multiple semi-circular bottom section segments, each semi-circular segment extending along part of a circumference of the top bearing ring. These semi-circular segments are held together by way of multiple stud bolts 39 which extent through indexed openings provided in the semi-circular segments.

The multiple semi-circular bottom section segments 23, each extending along part of a circumference of the top bearing ring 8 support the bottom roller raceway of the second row of axial load rollers. The semi-circular bottom section segments are by way of the strut bolts releasable attached to the mid-section and the top section of the top bearing ring 9.

FIG. 9 shows a cross sectional view of the slew bearing 7, with one of the semi-circular bottom sections 23 removed. FIG. 13 shows a side view of the same situation. By removing the single semi-circular section segment, part of the upper and lower raceways of the second row of axial load rollers is exposed. Removal of a segment thus allows for maintenance and refurbishment of the uncovered raceways, and some of the axial load rollers, without taking apart the entire bearing.

The multiple semi-circular mid-section segments 22, each extending along part of a circumference of the top bearing ring, are by way of the strut bolts releasable attached to the bottom section and the top section of the top bearing ring 9. FIG. 12 shows a cross sectional view of the slew bearing 7, with one of the semi-circular mid-sections 22 removed. FIG. 13 shows a side view of the same situation. The semi-circular mid-section segments 22 form a circumferential wall which functions as a guide surface 30 for positioning the top bearing ring 9 in the horizontal plane. The bottom bearing ring 10 has at the end of its flange section 20 a substantially vertical circumferential guide surface 29 on which guides, in the form of low friction elements 31, have been mounted. When the slew bearing 7 is in use, these low friction elements 31 contact the guide surface 30 of the semi-circular mid-sections 22, to support radial loads, more in particular transmit radial loads between the two bearing rings.

By removing the semi-circular mid-section segment 22, its guide surface 30 as well as the circumferential surface 29 of the flange section 20, and the low friction elements provided thereupon, are exposed. Removal of the segment thus allows for maintenance and refurbishment of the uncovered guide surface and low friction elements, without taking apart the entire bearing.

In the embodiment shown, the semi-circular top section segments, the semi-circular mid-section segments and the semi-circular bottom section segments are provide such that they overlap each other, see for example FIGS. 10 an 13.

In a further embodiment according to the invention, the semi-circular mid-section segment segments are shorter than the semi-circular bottom section segments, and overlap with the semi-circular lower segments. This facilitates removing a semi-circular mid-section segment without weakening the structure of the bearing ring.

It is noted that in the embodiment shown, the hoisting crane 1 is provided with a slew platform 5 provided with openings for receiving bolts, to clamp the slew bearing platform against the top bearing ring. Thus, the bolts used for keeping the top bearing ring together are also used for securing the slew platform onto the top bearing ring.

Figure 1:
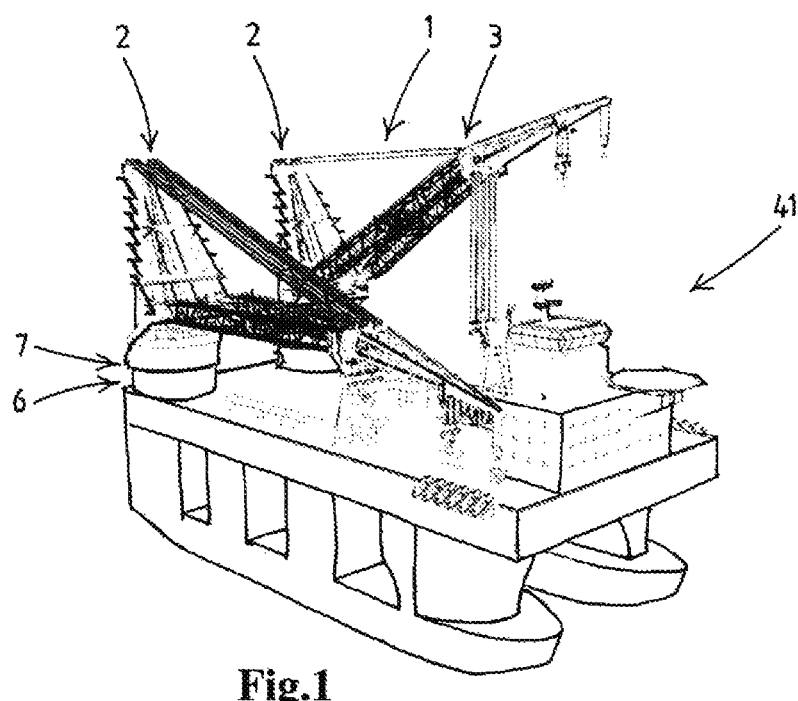
Figure 2:
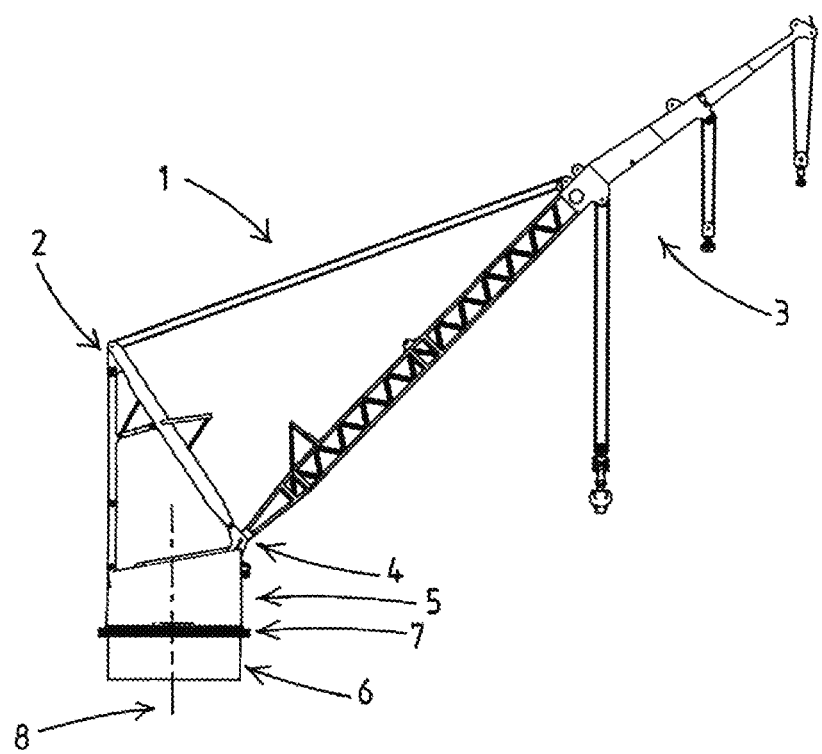
Figure 3:
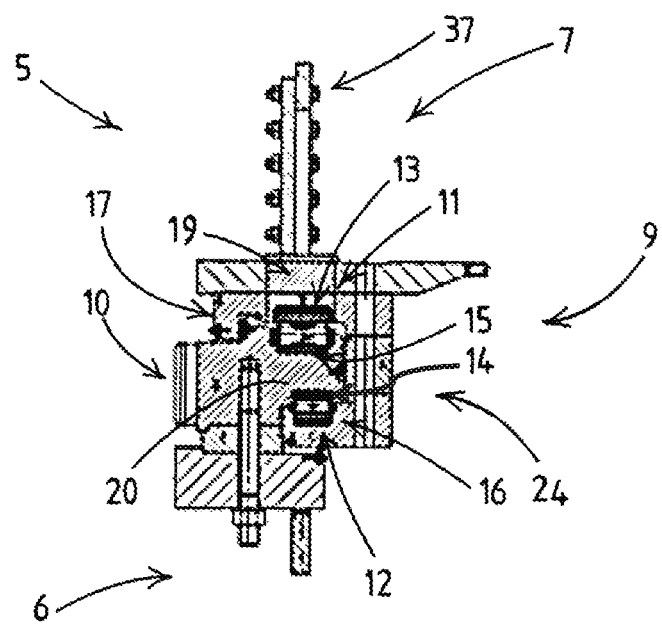
Figure 4:
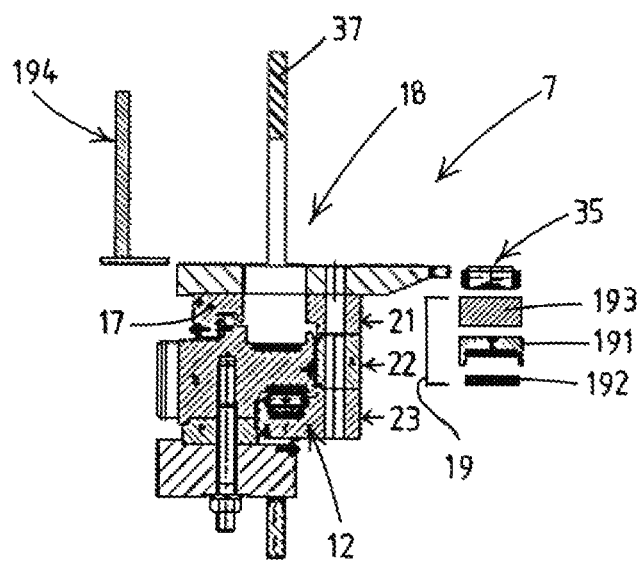
Figure 5A:
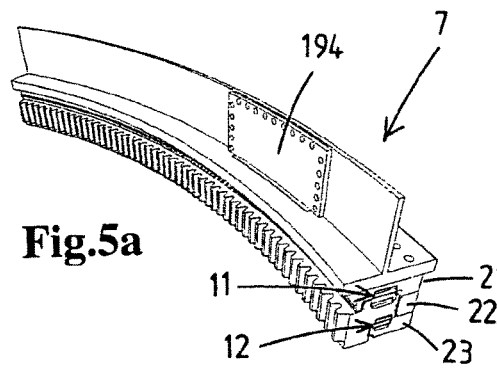
Figure 5B:
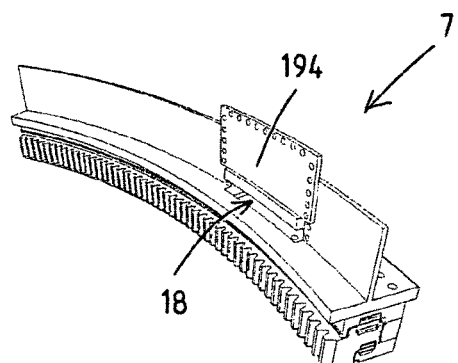
Figure 5C:
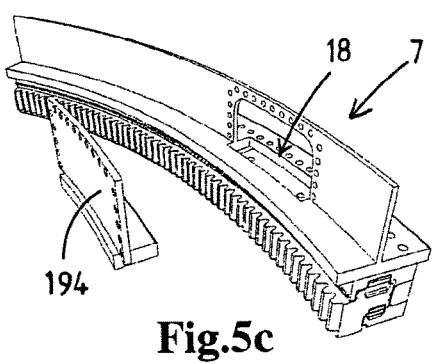
Figure 5D:
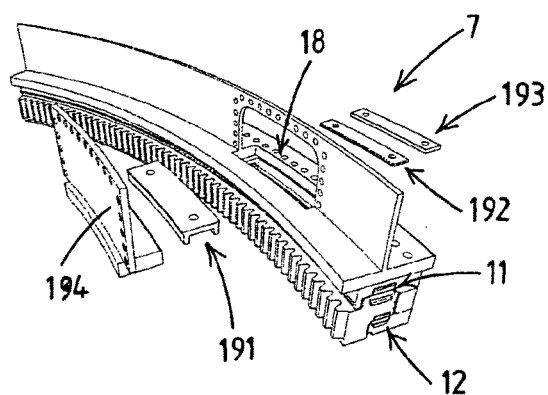
Figure 5E:
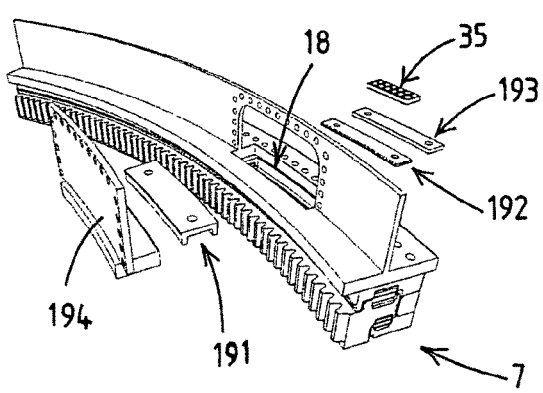
Figure 6:
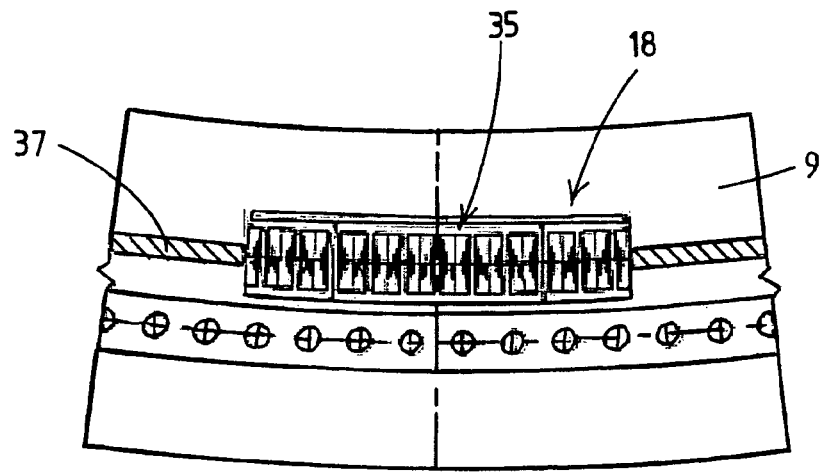
Figure 7:
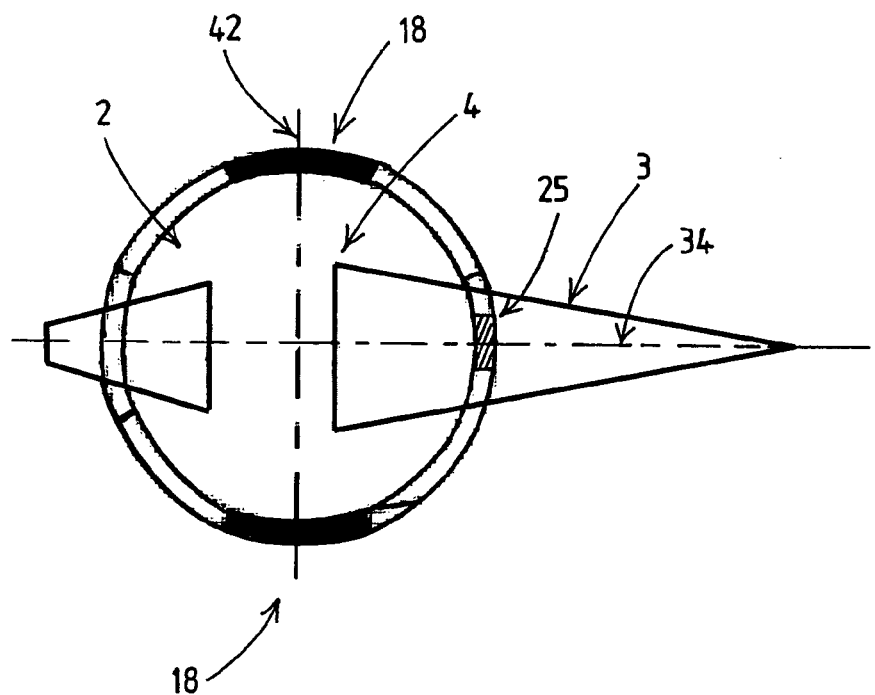
Figure 9:
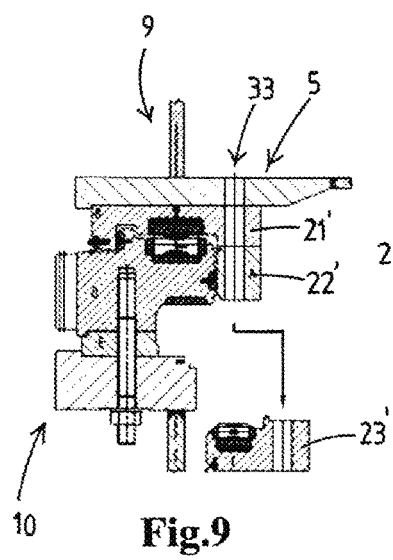
Figure 10:
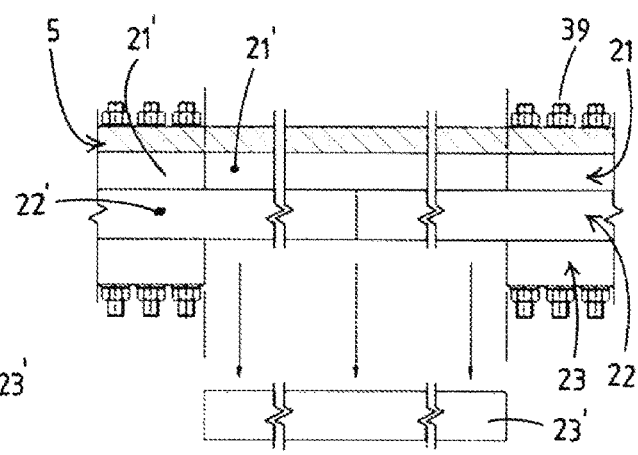
Figure 11:
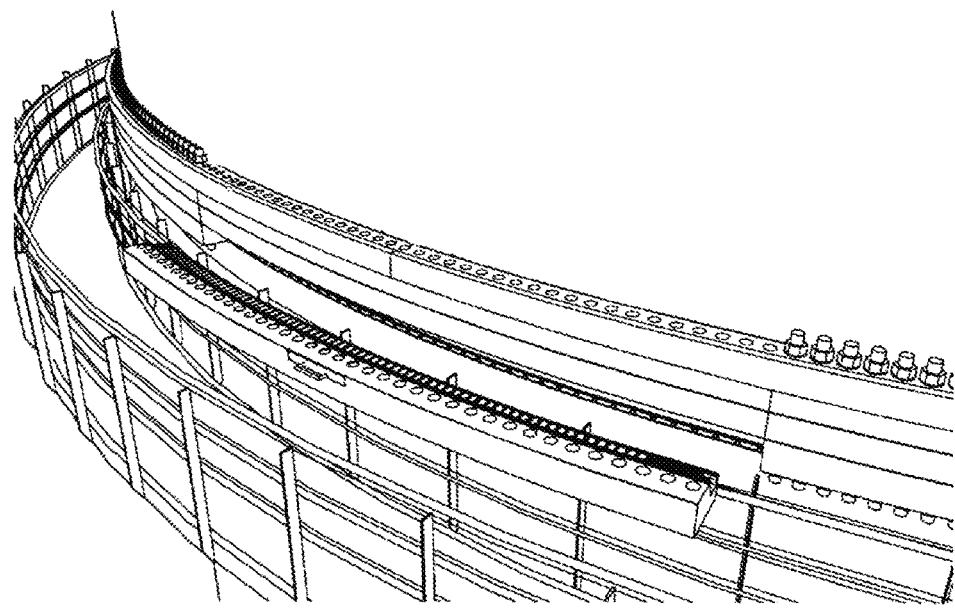
Figure 12:
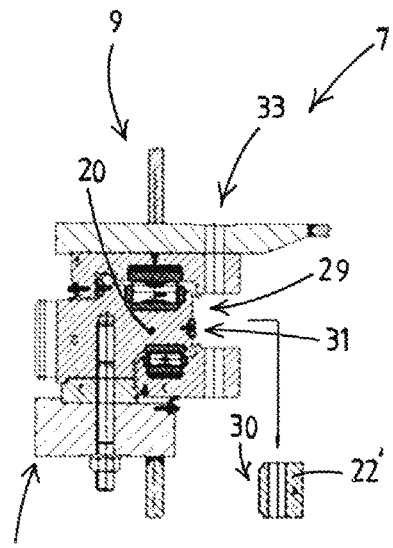
Figure 13:
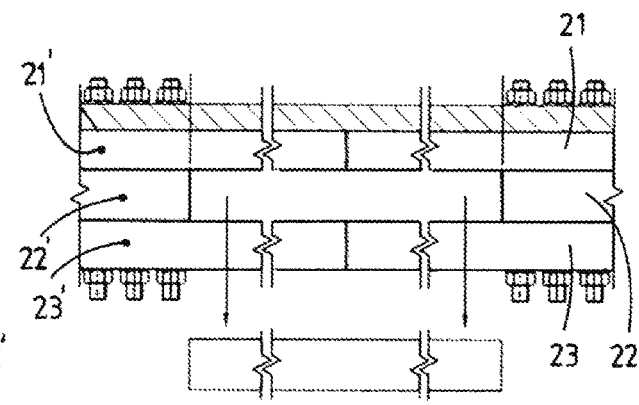
Figure 14:
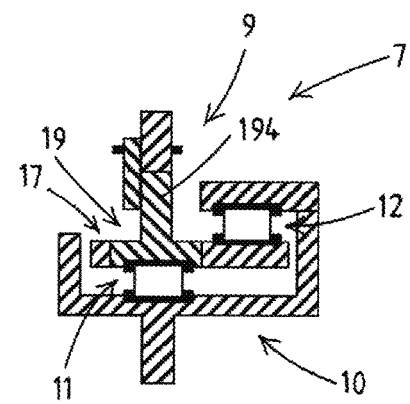
FIG. 14 shows cross sectional view of an alternative bearing according to the invention, in which the first and second row of rollers are not provided above each other. Furthermore, the second row of roller bodies is provided below the second row of roller bodies.
Figure 15:
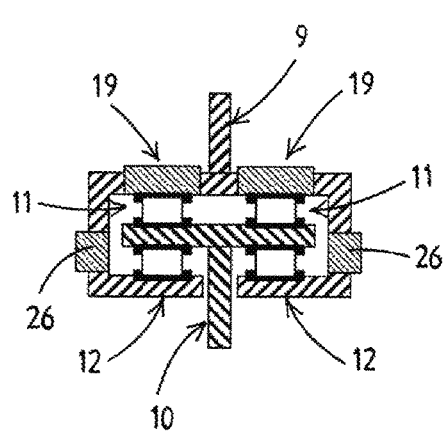
FIG. 15 shows cross sectional view of a second alternative bearing according to the invention, in which a double first row and a double second row are provided.

In both FIG. 14 and FIG. 15 elements which are similar with the elements described in relation with the previous figures have been provided with the same reference signs.

In the embodiment shown, a first and a second row of axial rollers is provided for supporting axial loads. Thus, the rotational axis of the first row of axial load rollers extend in a substantially horizontal plane and the rotational axis of the second row of axial load rollers extend in a substantially horizontal plane. In addition low friction pads are provided between the top and bottom bearing ring to support radial forces. It is noted that in an alternative embodiment, additional rows of axial load rollers can be provided. For example, the first row of axial load rollers can be replaced with two parallel, concentric rows of axial load rollers. Also, low friction pads can be replaced with rollers for supporting loads in the radial direction. Such rollers are typically provided with rotational axis extending in the vertical direction.

It is observed that in an embodiment according to the invention the slew platform supporting the crane structure is not provided as a separate element, but is integrated with the slew bearing, more in particular with a slew bearing ring, or with the crane structure.

Other variations to the disclosed embodiments can be understood and effected by those skilled in the art in practicing the claimed invention, from study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims.

The mere act that certain measures are recited in mutually different dependent claims does not indicate that a combination of these measured cannot be used to advantage. Any reference signs in the claims should not be construed as limiting the scope.

The invention is by no means limited to the exemplary embodiment described herein above, but comprises various modifications hereto, in so far as they fall within the scope of the following claims.

The invention claimed is:

1. A hoisting crane, comprising:
   a crane structure comprising a jib;
   a slew platform, wherein the slew platform supports the crane structure;
   a base, wherein the base supports the slew platform; and
   a slew bearing, wherein the slew bearing is provided between the base and the slew platform to transmit weight loads, tilting loads and radial loads between the slew platform and the base, and the slew bearing has a rotational axis that extends in a substantially vertical direction and allows the slew platform, and thus the crane structure comprising the jib, to be rotated relative to the base about the rotational axis;
   wherein the slew bearing comprises:
      a top bearing ring, wherein the top bearing ring is secured to the slew platform;
      a bottom bearing ring, concentric with said top bearing ring, wherein the bottom bearing ring is secured to the base;
      a first row of axial load rollers and a second row of axial load rollers, wherein the first and second rows of axial load rollers are each provided between a corresponding top roller raceway and bottom roller raceway, and wherein the top roller raceway and bottom roller raceway of the first row of axial load rollers are respectively connected to the top bearing ring and the bottom bearing ring, and the top roller raceway and bottom roller raceway of the second row of axial load rollers are respectively connected to the bottom bearing ring and the top bearing ring, so as to enable rotation of the top bearing ring relative to the bottom bearing ring, wherein the top bearing ring has a top wall, the top wall extends over the first row of axial load rollers and at least one top entry port is provided in the top wall to provide access through the top wall, from above, to the first row of axial load rollers, wherein the top roller raceway of the first row of axial load rollers comprises a removable raceway segment releasable attached in the top entry port, wherein the removable raceway segment is supported by the top wall, and is removable from said top entry port in the top wall to enable access via said top entry port to the first row of axial load rollers, wherein the top entry port and the removable raceway segment are dimensioned such that, when the removable roller raceway segment has been removed from said top entry port, via the top entry port, the axial load rollers can be removed in a substantially vertical direction from the first row of axial load rollers, wherein the bottom bearing ring comprises a flange section which extends in the radial direction, and wherein the top bearing ring has a substantially C-shaped cross section, having a top section, comprising the top wall with the at least one top entry port, a mid-section and a bottom section, wherein the top bearing ring engages the flange section of the bottom bearing ring such that the top section of the top bearing ring extends over the flange section of the bottom bearing ring and the bottom section extends below the flange section of the bottom bearing ring, and wherein the first row of axial load rollers is provided between the top section of the top bearing ring and the flange section of the bottom bearing ring, with the top and bottom roller raceways attached to the top bearing ring and the bottom bearing ring respectively, and wherein the second row of axial load rollers is provided between the bottom section of the top bearing ring and the flange section of the bottom bearing ring, with the top and bottom roller raceways attached to the bottom bearing ring and the top bearing ring respectively.

2. The hoisting crane according to claim 1, wherein the top bearing ring or the bottom bearing ring has a circumferential side wall, the side wall extends alongside the second row of axial load rollers, and is provided with at least one side entry port configured to allow access, in a lateral direction, to the second row of axial load rollers, wherein in each side entry port a removable insert is provided, which is releasable attached in the side entry port, and wherein the side entry port is dimensioned such that, when the removable insert has been removed from the side entry port, via the side entry port, the axial load rollers can be removed and replaced in a substantially lateral direction from the second row of axial load rollers.

3. The hoisting crane according to claim 2, wherein the slew platform and the jib are essentially symmetric relative to a vertical plane of symmetry, the vertical plane of symmetry comprises the rotational axis of the slew bearing, and the one side entry port is provided to be located below and in line with the jib, such that the side entry port is intersected by the plane of symmetry.

4. The hoisting crane according to claim 2, wherein the axial load rollers of the second row of axial load rollers are provided in roller bodies cages, the roller bodies cages position the axial load rollers relative to each other, each roller bodies cage holding at least two axial load rollers, and the side entry port is dimensioned such that the roller bodies cage holding the at least two axial load rollers can be removed and replaced via said side entry port.

5. The hoisting crane according to claim 1, wherein the bottom section of the C-shaped cross section of the top bearing ring comprises multiple semi-circular bottom section segments, each extending along part of a circumference of the top bearing ring, and the semi-circular bottom section segments are releasably attached to the mid-section and the top section of the top bearing, such that each one can be removed to expose part of the second row of axial load rollers and part of the upper and lower roller raceway guiding the second row of axial load rollers.

6. The hoisting crane according to claim 5, wherein the flange section at an end of the flange section has a substantially vertical guide surface, and the midsection forms a circumferential wall extending along the substantially vertical guide surface of the flange section, and between the substantially vertical guide surface and the midsection guides, are provided for supporting radial loads.

7. The hoisting crane according to claim 6, wherein the mid-section comprises multiple semi-circular mid-section segments, each extending along part of a circumference of the top bearing ring, and the semi-circular mid-section segments are releasably attached to the bottom section and the top section of the top bearing ring, such that they can be removed to expose part of the substantially vertical guide surface and the guides.

8. The hoisting crane according to claim 7, wherein the semi-circular mid-section segments are shorter than the semi-circular bottom section segments, and/or overlap with the semi-circular lower segments.

9. The hoisting crane according to claim 7, wherein the top section, the mid-section and the bottom section are provided with substantially vertical, indexed openings, in which openings bolts are provided that clamp the semi-circular bottom section segments and/or the semi-circular mid-section segments against the top section of the top bearing ring.

10. The hoisting crane according to claim 5, wherein the top section, the mid-section and the bottom section are provided with substantially vertical, indexed openings, in which openings bolts are provided that clamp the semi-circular bottom section segments and/or the semi-circular mid-section segments against the top section of the top bearing ring.

11. The hoisting crane according to claim 1, wherein the axial load rollers of the first row of axial load rollers are provided in roller bodies cages, the roller bodies cages position the axial load rollers relative to each other, each roller bodies cage holding at least two axial load rollers, and the top entry port is dimensioned such that the roller bodies cage holding the at least two axial load rollers can be removed and replaced via said top entry port.

12. The hoisting crane according to claim 1, wherein the removable raceway segment comprises a hatch for securing and/or supporting the removable raceway segment in the respective top entry port.

13. The hoisting crane according to claim 12, wherein the slew platform comprises a ring shaped wall located vertically above the first row of axial load rollers, and wherein the slew platform is provided with an opening above each top entry port, and the opening provides access to the top entry port.

14. The hoisting crane according to claim 1, wherein the diameter of the slew bearing is at least 25 m.

15. A vessel provided with the hoisting crane according to claim 1.

16. A method for refurbishing the hoisting crane according to claim 1, comprising the step of replacing axial load rollers of the slew bearing via the top entry port.

17. A hoisting crane, comprising:
   a crane structure comprising a jib;
   a slew platform, wherein the slew platform supports the crane structure;
   a base, wherein the base supports the slew platorm; and
   a slew bearing, wherein the slew bearing is provided between the base and the slew platform to transmit weight loads, tilting loads and radial loads between the slew platform and the base, and the slew bearing has a rotational axis that extends in a substantially vertical direction and allows the slew platform, and thus the crane structure comprising the jib, to be rotated relative to the base about the rotational axis;
   wherein the slew bearing comprises:
      a top bearing ring, wherein the top bearing ring is secured to the slew platform;
      a bottom bearing ring, concentric with said top bearing ring, wherein the bottom bearing ring is secured to the base;
      a first row of axial load rollers and a second row of axial load rollers, wherein the first and second rows of axial load rollers are each provided between a corresponding top roller raceway and bottom roller raceway, and wherein the top roller raceway and bottom roller raceway of the first row of axial load rollers are respectively connected to the top bearing ring and the bottom bearing ring, and the top roller raceway and bottom roller raceway of the second row of axial load rollers are respectively connected to the bottom bearing ring and the top bearing ring, so as to enable rotation of the top bearing ring relative to the bottom bearing ring,
      wherein the top bearing ring has a top wall, the top wall extends over the first row of axial load rollers and at least one top entry port is provided in the top wall to provide access through the top wall, from above, to the first row of axial load rollers,
      wherein the top roller raceway of the first row of axial load rollers comprises a removable raceway segment releasable attached in the top entry port, wherein the removable raceway segment is supported by the top wall, and is removable from said top entry port in the top wall to enable access via said top entry port to the first row of axial load rollers,
      wherein the top entry port and the removable raceway segment are dimensioned such that, when the removable roller raceway segment has been removed from said top entry port, via the top entry port, the axial load rollers can be removed in a substantially vertical direction from the first row of axial load rollers, and
   wherein the slew platform and the jib are essentially symmetric relative to a vertical plane of symmetry, the vertical plane of symmetry comprises the rotational axis of the slew bearing, and the at least one top entry port and a second top entry port are provided, each on one side of the plane of symmetry.

18. A slew bearing, comprising:
   a top bearing ring;
   a bottom bearing ring, concentric with said top bearing ring;
   a first row of axial load rollers and a second row of axial load rollers, wherein the first and second rows of axial load rollers are each provided between a corresponding top roller raceway and bottom roller raceway, and wherein the top roller raceway and bottom roller raceway of the first row of axial load rollers are respectively connected to the top bearing ring and the bottom bearing bring, and the top roller raceway and bottom roller raceway of the second row of axial load rollersare respectively connected to the bottom bearing ring and the top bearing ring, so as to enable rotation of the top bearing ring relative to the bottom bearing ring,
   wherein the top bearing ring has a top wall, the top wall extends over the first row of axial load rollers and at least one top entry port is provided in the top wall to provide access through the top wall, from above, to the first row of axial load rollers,
   wherein the top roller raceway of the first row of axial load rollers comprises a removable raceway segment releasable attached in the top entry port, wherein the removable racway segment is supported by the top wall, and is removable from said top entry port in the top wall to enable acess via said top entry port to the first row of saxial load rollers,
   wherein the top entry port and the removable racway segment are dimensioned such that, when the removable roller raceway segment has been removed from said top entry port, via the top entry port, the axial load rollers can be removed in a substantially vertical direction from the first row of axial load rollers,
   wherein the bottom bearing ring comprises a flange section which extends in the radial direction, and wherein the top bearing ring has a substantially C-shaped cross section, having a top section, comprising the top wall with the at least one top entry port, a mid-section and a bottom section,
   wherein the top bearing ring engages the flange section of the bottom bearing ring such that the top section of the top bearing ring extends over the flange section of the bottom bearing ring and the bottom section extends below the flange section of the bottom bearing ring, and
   wherein the first row of axial load rollers is provided between the top section of the top bearing ring and the flange section of the bottom bearing ring, with the top and bottom roller raceways attached to the top bearing ring and the bottom bearing ring respectively, and
   wherein the second row of axial load rollers is provided between the bottom section of the top bearing ring and the flange section of the bottom bearing ring, with the top and bottom roller raceways attached to the bottom bearing ring and the top bearing ring respectively.

* * * * *